United States Patent
Shibayama

(10) Patent No.: US 7,208,734 B2
(45) Date of Patent: Apr. 24, 2007

(54) INFRARED ARRAY DETECTION DEVICE

(75) Inventor: Katsumi Shibayama, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 287 days.

(21) Appl. No.: 10/483,249

(22) PCT Filed: Jul. 10, 2002

(86) PCT No.: PCT/JP02/07014

§ 371 (c)(1), (2), (4) Date: Jan. 9, 2004

(87) PCT Pub. No.: WO03/006939

PCT Pub. Date: Jan. 23, 2003

(65) Prior Publication Data

US 2004/0169144 A1    Sep. 2, 2004

(30) Foreign Application Priority Data

Jul. 12, 2001    (JP) ............................. 2001-212474

(51) Int. Cl.
G01J 5/12    (2006.01)
(52) U.S. Cl. .................................. 250/338.1; 255/436
(58) Field of Classification Search ............. 250/338.1; 255/436
See application file for complete search history.

(56) References Cited

U.S. PATENT DOCUMENTS

| | | | |
|---|---|---|---|
| 4,558,342 A | 12/1985 | Sclar | ............................ 357/30 |
| 6,476,455 B2 * | 11/2002 | Toyoda et al. | ............. 257/436 |
| 2002/0050623 A1 | 5/2002 | Toyoda et al. | ............. 257/444 |

FOREIGN PATENT DOCUMENTS

| | | |
|---|---|---|
| EP | 1 213 570 A2 | 6/2002 |
| JP | 02-208525 | 8/1990 |
| JP | 03-276772 | 12/1991 |
| JP | 04-113237 | 4/1992 |
| JP | 07-198479 | 8/1995 |
| JP | 11-148868 | 6/1999 |
| JP | 11-191644 | 7/1999 |
| JP | 2002-176204 | 6/2002 |
| JP | 2002-202195 | 7/2002 |

OTHER PUBLICATIONS

International Application No. PCT/JP02/07014 International Preliminary Examination Report (English Translation).

* cited by examiner

Primary Examiner—David Porta
Assistant Examiner—Shun Lee
(74) Attorney, Agent, or Firm—Drinker Biddle & Reath LLP

(57) ABSTRACT

In an infrared detector array according to the present invention, on a thin film with a periphery portion supported by a frame, three or more infrared detecting pixels are arranged in an array pattern so that the hot junctions of thermocouples are arranged above a concave portion and the cold junctions thereof are arranged above the frame. Compensation means is provided which compensates for a difference between the detection sensitivity of the infrared detecting pixel arranged in a peripheral end portion and the detection sensitivity of the infrared detecting pixel arranged in an intermediate portion based on a correlation between electromotive force extracted when the infrared detecting pixel is illuminated with infrared radiation and its position. Owing to this configuration, a plurality of infrared detecting pixels can be integrated and the sensitivity thereof can be made sufficiently high and uniform.

10 Claims, 10 Drawing Sheets

*Fig.3A* *Fig.3B*
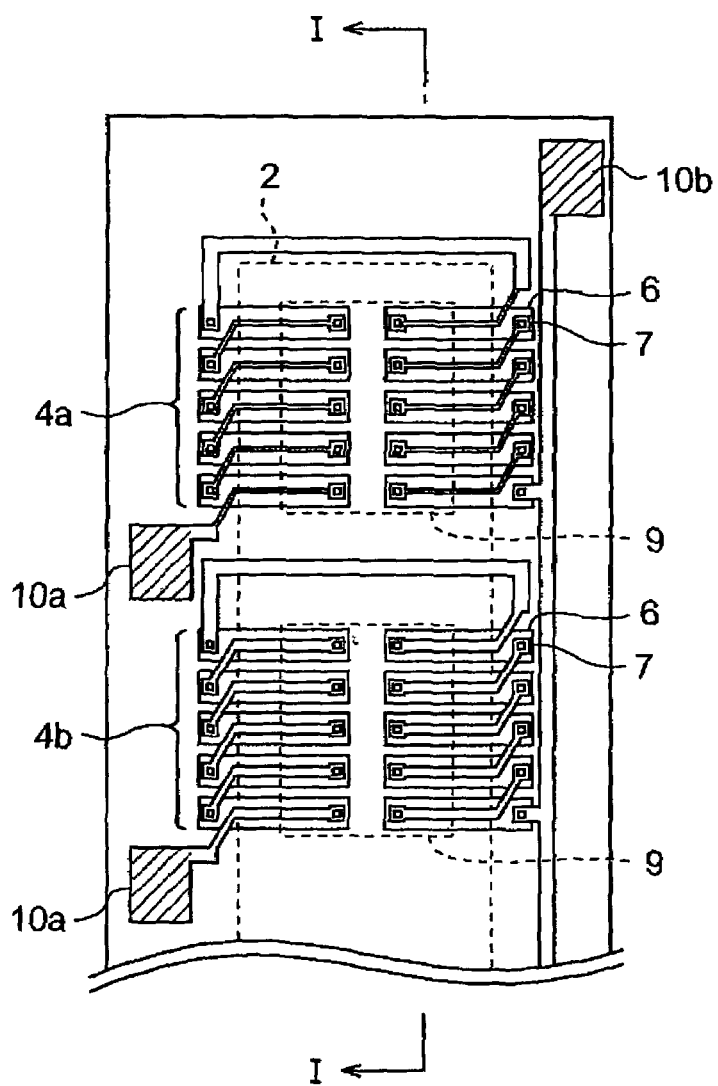
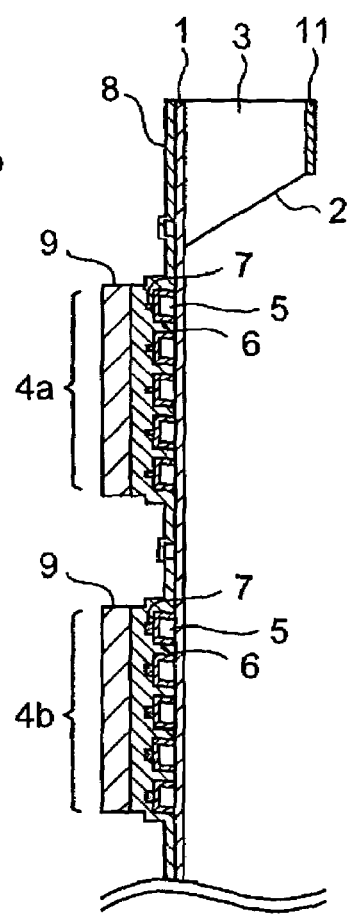

Fig.5A
Fig.5B
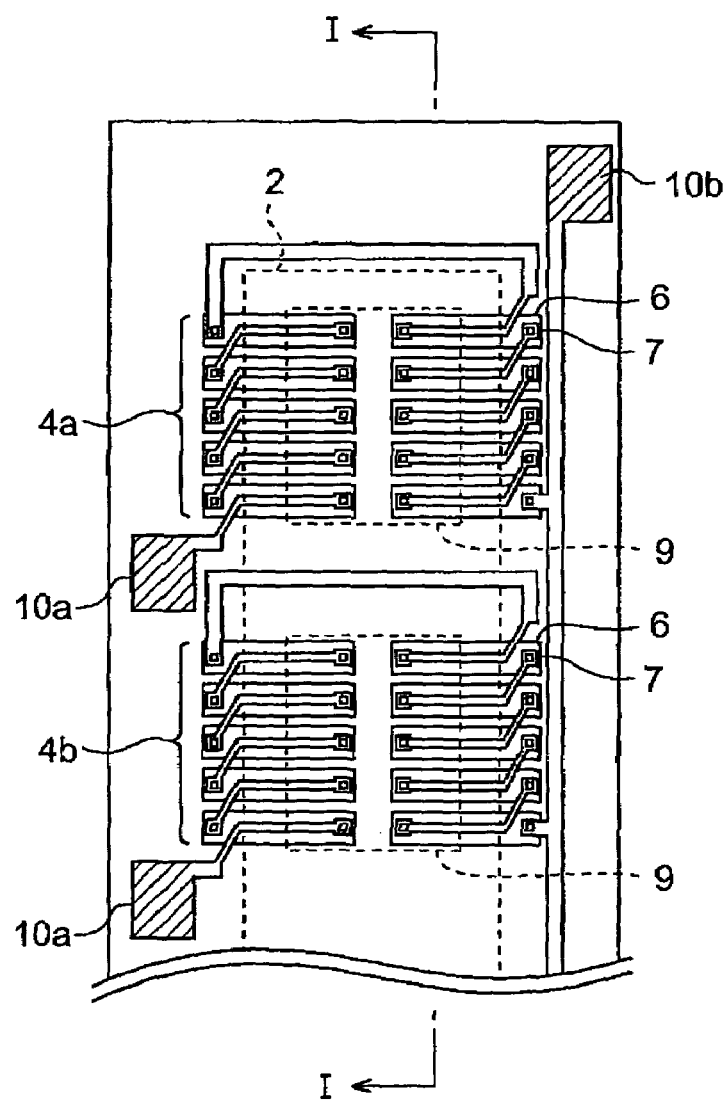
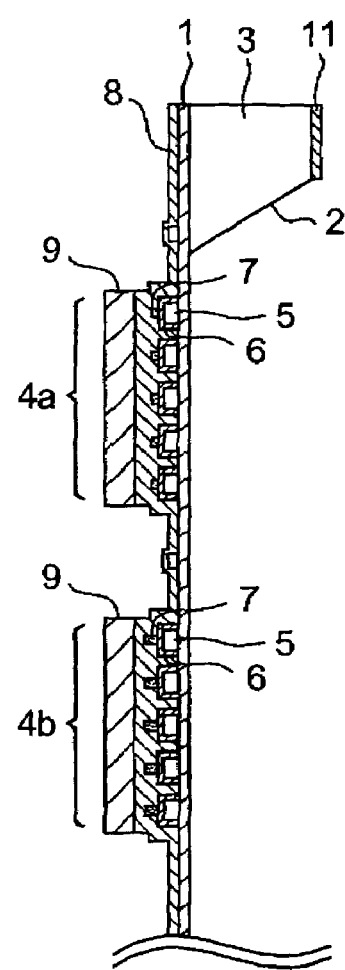

*Fig.9A*
*Fig.9B*
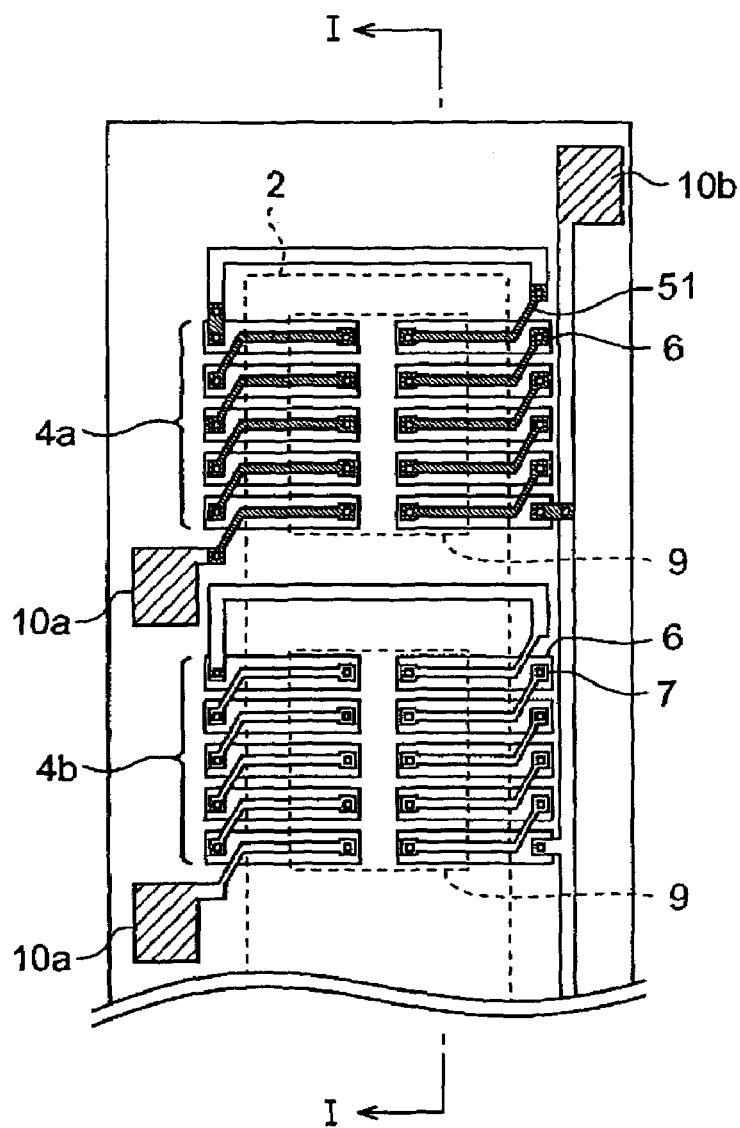
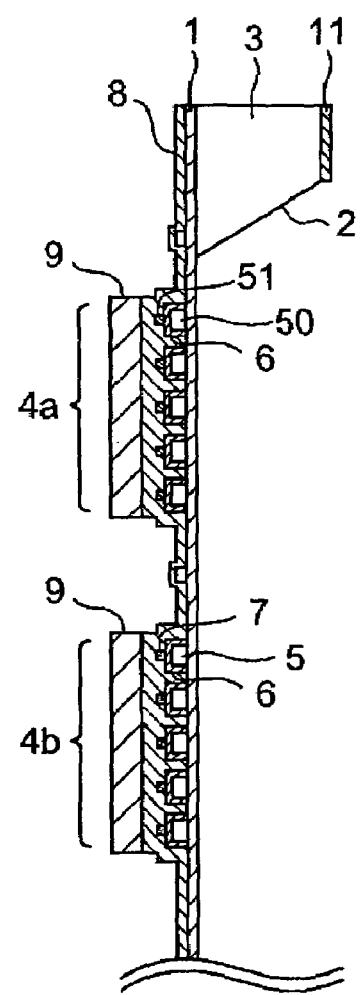

INFRARED ARRAY DETECTION DEVICE

TECHNICAL FIELD

The present invention relates to an infrared detector array, and in particular, to an infrared detector array in which three or more infrared detecting pixels are formed in an array.

BACKGROUND ART

As a conventional thermophila detector, Japanese Patent Publication No. 2663612 discloses a thermophila which is constituted of a plurality of series-connected thermocouples comprised of a p-type semiconductor and an n-type semiconductor. In such an infrared detector, the Seebeck effect is used. That is, the amount of infrared radiation (quantity of heat), which is incident on the infrared detector, is measured based on the electromotive force generated by a temperature difference between hot junctions and cold junctions of the thermocouples when the heat generated by absorption of infrared radiation is transferred to the thermocouples in an infrared absorbing film.

The above-mentioned conventional infrared detector is used as, for example, a pixel of an infrared detector array. That is, a plurality of infrared detectors are arranged on a substrate in an array pattern. By picking up the electromotive force generated by each infrared detector as a pixel information signal, the difference in the amount of infrared radiation due to the different position is measured.

DISCLOSURE OF THE INVENTION

An object of the present invention is to provide an infrared detector array capable of integrating a plurality of infrared detecting pixels and making their detection sensitivity sufficiently high and uniform.

Generally, in an infrared detector array, it is essential that the detection sensitivity is high and uniform. However, in the above-described conventional infrared detector array, when heat is transferred from the infrared absorbing film to the thermocouples, part of the heat may be transferred to the substrate. The thermoelectric conversion efficiency is then decreased, and accordingly the detection sensitivity is decreased. In order to prevent the detection sensitivity from decreasing, the substrate is processed into a diaphragm structure by etching the substrate from its backside. In the case of the diaphragm structure, the hot junctions of the thermocouples are arranged above a thin plate portion of the substrate, and the cold junctions of the thermocouples are arranged above a thick plate portion. This reduces the loss due to the heat conductivity of the substrate.

However, if a plurality of infrared detectors are arranged on the substrate of a diaphragm structure as described above, heat transferred to the substrate depends on the position of the infrared detector. This leads to a problem that the infrared detectors have various thermoelectric conversion efficiency, thereby failing to obtain uniform detection sensitivity. For example, in the infrared detectors arranged in a one-dimensional array pattern, the infrared detector positioned at either end of the array is closer to the thick plate portion of the substrate than the other infrared detectors. Therefore, heat generated due to absorption of infrared radiation in the infrared detector positioned at either end of the array is readily transferred to the thick plate portion. Accordingly, the thermoelectric conversion efficiency is decreased and the detection sensitivity is likely to be decreased.

By mating the thin plate portion of the substrate extremely large to ensure a sufficient distance between the infrared detectors at both end portions and the thick plate portion, or by providing an independent thin plate portion to each infrared detector, the sensitivity of the infrared detectors could be made uniform. However, such a method is not preferred in practice because it has difficulty in miniaturization and integration of the device.

The infrared detector array according to the present invention comprises: a thin film formed from insulating material; a frame having a concave portion and supporting a periphery portion of the thin film; three or more infrared detecting pixels arranged on the thin film in an array pattern, each pixel being configured such that a plurality of thermocouples having hot junctions formed above the concave portion and cold junctions formed above the frame are connected in series and an infrared absorbing layer is formed so as to cover the hot junctions from above; and compensation means for compensating for a difference between detection sensitivity of the first infrared detecting pixel arranged in a peripheral end portion and detection sensitivity of the second infrared detecting pixel arranged in an intermediate portion, wherein said compensation means is based on a correlation between thermoelectromotive force, which is extracted when the infrared detecting pixel is illuminated with infrared radiation, and its position.

In the infrared detector array according to the present invention, three or more infrared detecting pixels are formed on the thin film in an array pattern so that the hot junctions of the thermocouples are arranged above the concave portion and the cold junctions thereof are arranged above the frame. Accordingly, in each infrared detecting pixel, heat generated due to absorption of infrared radiation is efficiently transferred from the infrared absorbing layer to the thermocouples.

Further, in view of the arrangement direction of the infrared detecting pixels, the first infrared detecting pixels arranged in the peripheral end portion are closer to the frame. As a result, a greater quantity of heat is transferred to the frame in the first infrared detecting pixel than in the second infrared detecting pixel arranged in the intermediate portion, but the difference in electromotive force due to the difference in the heat loss between these detection pixels is compensated for by the compensation means. Accordingly, the detection sensitivity of the infrared detecting pixel can be made substantially identical irrespective of its position without enlarging the concave portion of the frame or providing the same separately to each infrared detecting pixel. Accordingly, a plurality of infrared detecting pixels can be integrated, and their detection sensitivity can be made sufficiently high and uniform.

Further, the infrared detector array according to the present invention is preferably configured such that the thin film is comprised of a film of insulating material formed on a silicon substrate, and that the frame has been formed by etching an area of the silicon substrate enclosed by its periphery portion from a face opposite to a face on which the thin film is formed. Since the concave portion is formed by etching, a precise configuration of the concave portion can be realized.

Still further, in the infrared detector array according to the present invention, it would be useful if one of the electrodes constituting the thermocouple is made of polysilicon having a predetermined conductivity type and the other is aluminum. Because of this configuration, the infrared detector array according to the present invention can measure the quantity of infrared illumination with a sufficiently high thermoelectric conversion efficiency.

Still further, in the infrared detector array according to the present invention, the compensation means is preferably realized by providing a greater number of thermocouples in the first infrared detecting pixel than in the second infrared detecting pixel. Even when a greater amount of heat is transferred to the frame in the first infrared detecting pixel than in the second infrared detecting pixel, the compensation means will compensate for the difference in electromotive force due to the difference in the heat loss with the additional thermocouples in the first infrared detecting pixel. Accordingly, the detection sensitivity of the infrared detecting pixels can be substantially identical irrespective of its position.

Still further, in the infrared detector array according to the present invention, the compensation means may be realized by setting the width of the member constituting the thermocouple to be narrower in the first infrared detecting pixel than in the second infrared detecting pixel. Owing to this configuration, the heat loss through the thermocouples is smaller in the first infrared detecting pixel than in the second infrared detecting pixel. The difference in the quantity of heat lost from the thermocouples compensates for the difference in the heat loss due to the different position of the infrared detecting pixel. Accordingly, the detection sensitivity of the infrared detecting pixels is made sufficiently uniform.

Still further, in the infrared detector array according to the present invention, the compensation means may be realized by setting the length of the member constituting the thermocouple to be longer in the first infrared detecting pixel than in the second infrared detecting pixel. Owing to this configuration, the heat loss through the thermocouples is smaller in the first infrared detecting pixel than in the second infrared detecting pixel. The difference in the heat loss through the thermocouples compensates for the difference in the heat loss due to the different position of the infrared detecting pixel. Accordingly, the detection sensitivity of the infrared detecting pixels is made sufficiently uniform.

Still further, in the infrared detector array according to the present invention, the compensation means may be realized by setting the thickness of the member constituting the thermocouple to be smaller in the first infrared detecting pixel than in the second infrared detecting pixel. Owing to this configuration, the heat loss through the thermocouples is smaller in the first infrared detecting pixel than in the second infrared detecting pixel. The difference in the heat loss through the thermocouples compensates for the difference in the heat loss due to the different position of the infrared detecting pixel. Accordingly, the detection sensitivity of the infrared detecting pixels is made sufficiently uniform.

Still further, in the infrared detector array according to the present invention, the compensation means may be realized by the second infrared detecting pixel further comprising a dummy wiring which is connected to the member constituting the thermocouple and which is formed from material having a thermal conductivity greater than or equal to that of the member. Owing to this configuration, part of the heat generated in the second infrared detecting pixel is lost by heat conduction of the dummy wiring. Accordingly, even when a greater amount of heat is transferred to the frame in the first infrared detecting pixel than in the second infrared detecting pixel, the heat loss through the dummy wiring compensates for the difference in electromotive force due to the difference in the heat loss through the frame. Accordingly, the detection sensitivity of the infrared detecting pixels is made sufficiently uniform.

Still further, in the infrared detector array according to the present invention, the compensation means may be realized by replacing part of the member constituting the thermocouple in the first infrared detecting pixel with material having a thermal conductivity lower than that of the member and capable of being electrically connected to the member. Owing to this configuration, the heat loss through the thermocouples is smaller in the first infrared detecting pixel than in the second infrared detecting pixel. The difference in the heat loss through the thermocouples compensates for the difference in the heat loss due to the different position of the infrared detecting pixel. Accordingly, the detection sensitivity of the infrared detecting pixels is made sufficiently uniform.

Still further, in the infrared detector array according to the present invention, the compensation means may be realized by replacing part of the member constituting the thermocouple in the second infrared detecting pixel with material having a higher thermal conductivity than that of the member and capable of being electrically connected to the member. Owing to this configuration, the heat loss through the thermocouples is smaller in the first infrared detecting pixel than in the second infrared detecting pixel. The difference in the heat loss through the thermocouples compensates for the difference in the heat loss due to the different position of the infrared detecting pixel. Accordingly, the detection sensitivity of the infrared detecting pixels is made sufficiently uniform.

BRIEF DESCRIPTION OF THE DRAWINGS

FIG. 3A is a view showing a thermophila pattern of an infrared detector array according to a second embodiment, and FIG. 3B is a sectional view taken along the line I—I in FIG. 3A;

FIG. 5A is a view showing a thermophila pattern of an infrared detector array according to a fourth embodiment, and FIG. 5B is a sectional view taken along the line I—I in FIG. 5A;

FIG. 9A is a view showing a thermophila pattern of an infrared detector array according to an eighth embodiment, and FIG. 9B is a sectional view taken along the line I—I in FIG. 9A.

BEST MODE FOR CARRYING OUT THE INVENTION

Figure 1A:
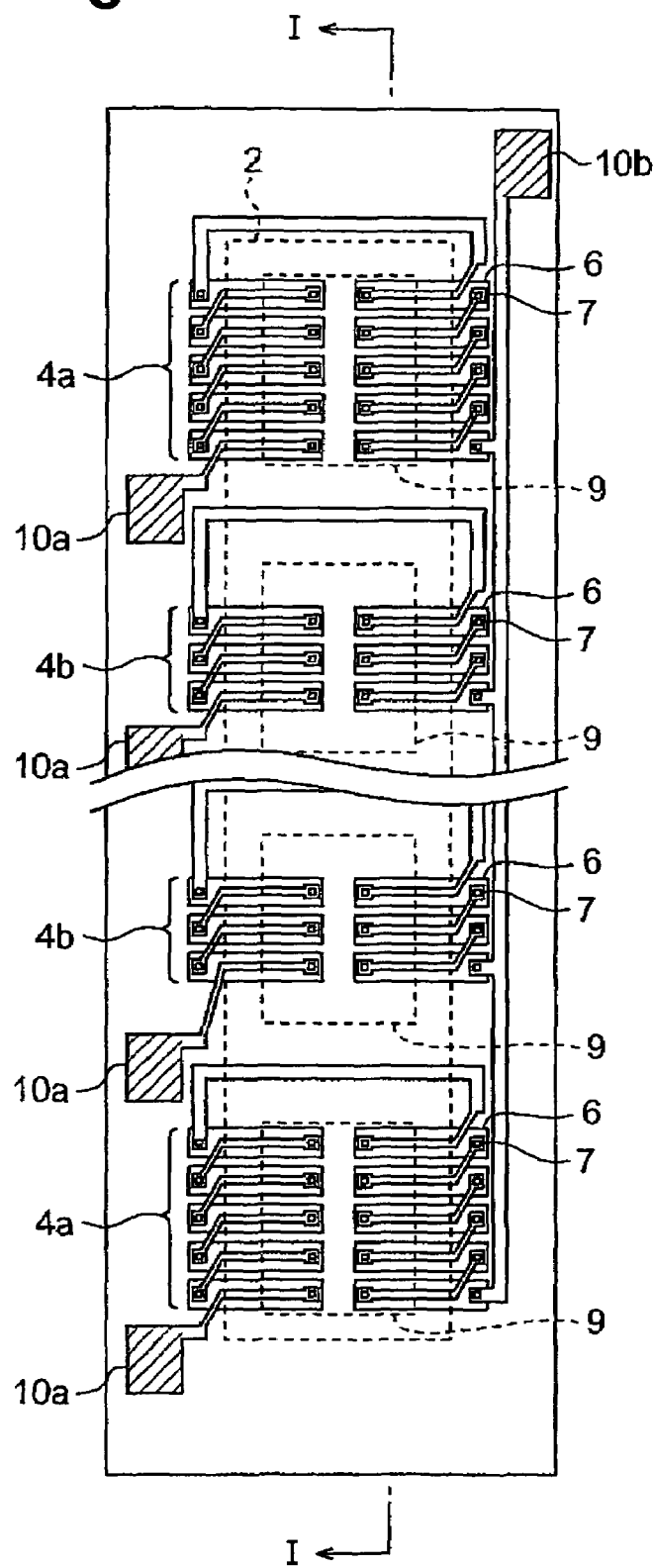
FIG. 1A is a view showing a thermophila pattern of an infrared detector array according to a first embodiment.

Referring to the drawings, preferred embodiments of the present invention will be described in detail. In the drawings, the same or equivalent parts will be given the same reference numerals or letters, and redundant descriptions thereof will be omitted.

Figure 1B:
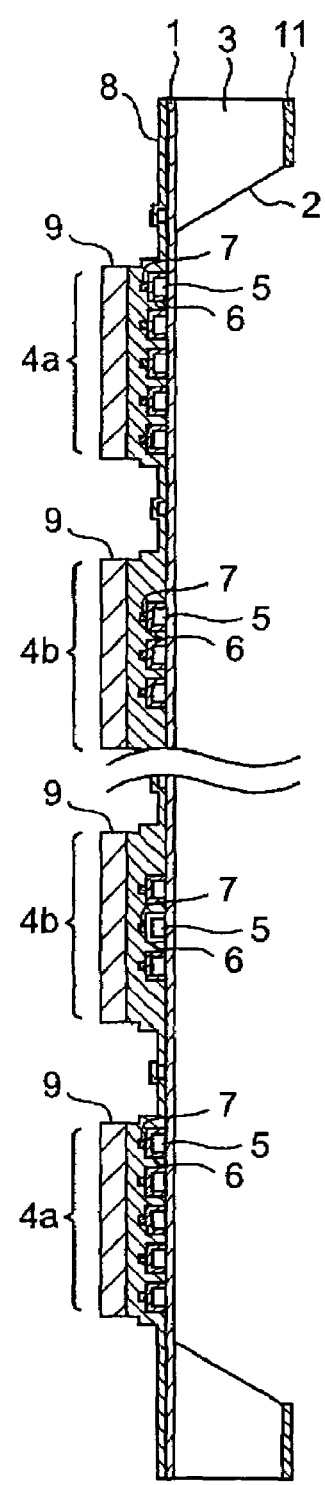
FIG. 1B is a sectional view taken along the line I—I in FIG. 1A.

FIG. 1A is a view showing a thermophila pattern of an infrared detector array according to a first embodiment. FIG. 1B is a sectional view taken along the line I—I in FIG. 1A. As shown, a support member having a diaphragm structure comprises a thin film 1 and a frame 3 made of silicon. The frame 3 has a rectangular (square or oblong) concave portion 2. The frame 3 supports the periphery portion of the thin film 1. Infrared detection pixels 4a and 4b are arranged on the thin film 1 in a one-dimensional array pattern.

The infrared detecting pixels 4a arranged in both end portions and the infrared detecting pixels 4b arranged in the intermediate portion are different in the number of thermocouples constituting the thermophila, but have the same configuration. The pixel size of the infrared detecting pixels 4a and 4b is determined by the infrared absorbing films 9 having an identical size. In each infrared detecting pixel, a polysilicon film 5 doped with n-type or p-type impurities at a concentration of $10^{18}$–$10^{20}$ cm$^{-3}$, a SiO$_2$ film 6 as an insulation film, and an aluminum film 7 that is narrower than the polysilicon film 5 in width are laminated on the thin film 1 in this order. The polysilicon film 5 and the aluminum film 7 are connected to each other through a bore in the SiO$_2$ film 6, and a thermocouple is thus formed. A plurality of these thermocouples are connected in series with each other to form a thermophila. As shown in FIG. 1A, the laminated polysilicon film 5 and aluminum film 7 are formed on the opposing two sides of the frame 3 and extend from the frame 3 toward the center above the concave portion 2.

The exposed surface of the thin film 1 and the thermopiles are coated with a passivation film 8 of silicon nitride (hereinafter referred to as SiN). Formed on the passivation film 8 is an infrared absorbing film 9 so as to cover the bore portions of the SiO$_2$ film 6 formed above the concave portion 2. And of the junctions between the polysilicon films 5 and the aluminum films 7 at the bore portions of the SiO$_2$ films 6, the junctions formed above the concave portion 2 are covered with the infrared absorbing film 9. The junction covered with the infrared absorbing film 9 serves as a hot junction. On the other hand, the junctions formed above the frame 3 are not covered with the infrared absorbing film 9. The junction not covered with the infrared absorbing film 9 serves as a cold junction. When heat is generated in the infrared absorbing film 9 due to absorption of infrared radiation, a temperature difference is generated between the hot junction and cold junction of the thermocouple, and electromotive force is generated by the Seebeck effect.

In view of the arrangement direction (the direction along the line I—I shown in FIG. 1A) of the infrared detecting pixels, since the infrared detecting pixel 4a is arranged closer to the frame 3 than the infrared detecting pixel 4b, the quantity of heat transferred to the frame 3 is greater in the infrared detecting pixel 4a. In the infrared detector array according to the first embodiment, the number of thermocouples constituting the thermophila is determined to be greater in the infrared detecting pixel 4a than in the infrared detecting pixel 4b based on the correlation between the electromotive force generated by infrared illumination of the infrared detecting pixel 4a, 4b and the position of the infrared detecting pixel. Accordingly, even when a difference is generated in the electromotive force between the infrared detecting pixels 4a and 4b due to any difference in the quantity of heat transferred to the frame 3, the difference in the electromotive force is compensated for by the electromotive force generated by the additional thermocouples in the infrared detecting pixel 4a. Therefore, if the quantity of infrared illumination is the same, the electromotive force extracted from each infrared detecting pixel is substantially the same irrespective of its position. That is, the thermocouples in the infrared detecting pixel 4a work as compensation means.

To one end of the thermophila included in the infrared detecting pixels 4a and 4b is connected an extraction electrode 10a separately for each infrared detecting pixel, and to the other end is connected a common extraction electrode 10b as a common electrode for the infrared detecting pixels. The electromotive force generated by the thermocouples due to absorption of infrared radiation is extracted as a pixel information signal by the electrodes 10a and 10b, and the difference in the quantity of infrared illumination due to the difference in the one-dimensional position is measured.

A method of forming the frame 3 will be described below. First of all, on the surface of a silicon substrate having a predetermined diameter and thickness, a thin film 1, a thermophila pattern, a passivation film 8 and an infrared absorbing film 9 are formed. Secondly, on the face (rear face) of the silicon substrate opposite to the face on which the thin film 1 is formed, a mask 11 made from SiN or the like having resistance to silicon etchant is formed. Thirdly, an opening for forming a concave portion 2 in the mask 11 is formed by means of photolithography and etching. Finally, while protecting the surface of the silicon substrate from being etched, the silicon substrate is etched according to the mask 11. The silicon exposed to the opening of the mask 11 is etched to form the concave portion 2. Since the thin film 1 has resistance to the etchant, the thin film 1 is left so as to cover the concave portion 2. If the mask 11 is formed on the (100) surface of the silicon substrate by using, for example, potassium hydroxide solution or the like as the etchant, anisotropic etching can be made. Thus, a diaphragm structure having the concave portion 2 shown in FIG. 1B can be formed. The thin film 1 may be formed from silicon nitride (SiN) or SiO$_2$. Alternatively, the thin film 1 may be formed of a multilayer film including any one of SiN, SiO$_2$, PSG (Phospho Silicate Glass), and BPSG (Boron Phospho Silicate Glass). The thickness of the thin film 1 is 0.5–5 μm.

The passivation film 8 may be an insulation film such as a SiO$_2$ or polyimide film. The infrared absorbing film 9 is formed from material, which readily absorbs infrared, and has adhesion. Blackened resin is preferred for such material. As for the blackened resin, resin (epoxy, silicone, acrylic, urethane, polyimide, etc.) mixed with black filler such as carbon filler, black resist and the like are available.

According to the infrared detector array of the first embodiment, a plurality of infrared detecting pixels are formed in an array pattern so that the hot junctions of thermocouples composed of the polysilicon films 5 and aluminum films 7 are arranged above the concave portion 2, and the cold junctions thereof are arranged above the frame 3. Since the infrared absorbing film 9 is formed so as to cover all of the hot junctions, the heat generated in the infrared absorbing film 9 due to absorption of infrared radiation is transferred efficiently to the thermocouples.

Since the number of thermocouples in the infrared detecting pixel 4a is greater than the number of thermocouples in the infrared detecting pixel 4b, the difference in electromotive force due to the difference in the quantity of heat transferred to the frame 3 is compensated for by the electromotive force generated by the thermocouples in the infrared detecting pixel 4a. Therefore, the detection sensitivity of the infrared detecting pixels is made sufficiently uniform, and thus the difference in the quantity of infrared illumination due to the different position can be measured precisely.

Therefore, according to the infrared detector array of the first embodiment, a plurality of infrared detecting pixels can be integrated, and their detection sensitivity can be made sufficiently high and uniform. Also in other embodiments described later, the same effect can be obtained by setting the number of thermocouples as described above.

Further, in the infrared detector array according to the first embodiment, since the polysilicon film 5 and the aluminum film 7 are laminated to form a thermocouple, the arrangement area required for one thermocouple becomes smaller. Accordingly, the thermocouples can be arranged at a high density. Furthermore, the thermophila has a high mechanical support strength because it has a triple layer structure in which the polysilicon film 5, the $SiO_2$ film 6 and the aluminum film 7 are laminated in this order. Since this triple layer structure is formed extending from the frame 3 to the concave portion 2, the mechanical strength of the concave portion 2 is increased. Still further, above the concave portion 2, since the infrared absorbing film 9, which is a single mass of material having adhesion, is attached so as to cover the thin film 1 and the thermophila pattern, the mechanical strength of the film-attached area in the concave portion 2 is further increased.

Generally, since aluminum has relatively high thermal conductivity, the heat obtained at the hot junctions is readily transferred to the frame 3 through the aluminum film 7. Therefore, the sensitivity of the infrared detecting pixel may be decreased. However, in the infrared detector array of the first embodiment, since the aluminum film 7 is thinly built up on the polysilicon film 5 being interposed by the $SiO_2$ film 6, the aluminum film 7 and the silicon frame 3 are thermally insulated from each other. This prevents the sensitivity of the infrared detecting pixel from being decreased. The $SiO_2$ film 6 has not only a function of electric insulation between the polysilicon film 5 and the aluminum film 7 but also a function of thermal insulation to prevent heat from being transferred from the polysilicon film 5 to the aluminum film 7.

Generally, the sensitivity of the infrared detecting pixel may be decreased because infrared radiation incident on the infrared absorbing film 9 is reflected by the aluminum film 7 formed under the infrared absorbing film 9. However, in the infrared detecting pixel of the first embodiment, since the aluminum film 7 is made narrow in width, the reflection of infrared radiation is reduced. Further, since the infrared absorbing film 9 also absorbs the infrared radiation reflected by the aluminum film 7, the sensitivity of the infrared detecting pixel is further prevented from being decreased.

Figure 2:
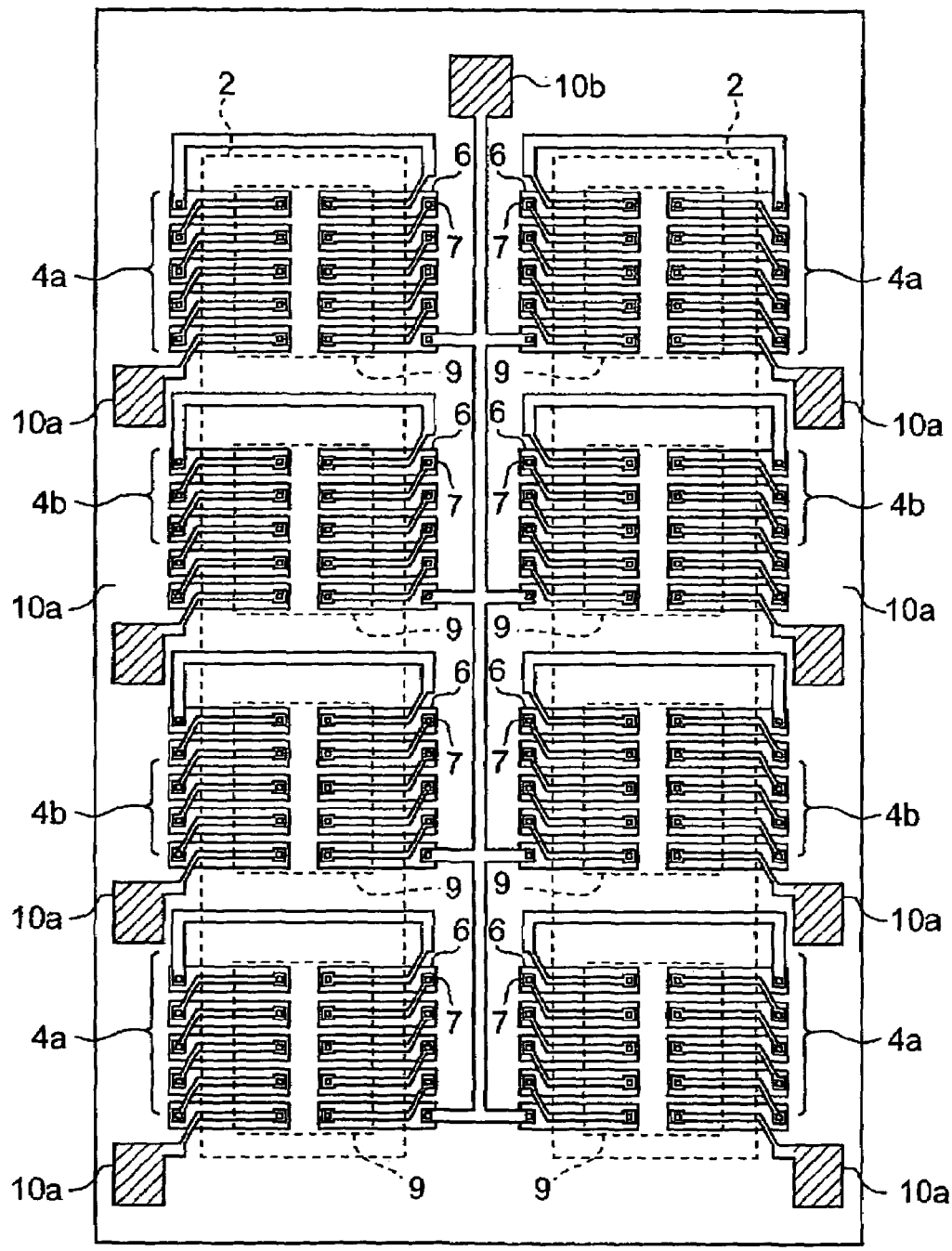
FIG. 2 is a view showing a thermophila pattern of another example of the infrared detector array according to the first embodiment.

The first embodiment is not limited to the above. FIG. 1 shows an example in which the infrared detecting pixels 4a and 4b are arranged in a one-dimensional array pattern. In the first embodiment, as shown in FIG. 2, two concave portions 2 may be formed in the frame 3, and the infrared detecting pixels 4a and 4b may be arranged in a two-dimensional array from the area above the frame 3 to the area above the respective concave portions 2. This configuration enables to measure the two-dimensional difference in the quantity of infrared illumination. Also in the other embodiments described later, the same effect can be obtained by arranging a plurality of infrared detecting pixels in a two-dimensional array.

FIG. 3A is a view showing a thermophila pattern of an infrared detector array according to a second embodiment. FIG. 3B is a sectional view taken along the line I—I in FIG. 3A. In the infrared detector array according to the second embodiment, infrared detecting pixels, which have the same configuration as that of the infrared detecting pixels in the infrared detector array according to the first embodiment shown in FIGS. 1A and 1B, are arranged in a one-dimensional array pattern. In the infrared detector array according to the second embodiment, although the number of thermocouples in the infrared detecting pixels 4a and 4b is the same, the width of the aluminum film 7 in the infrared detecting pixel 4a is made narrower than that of the aluminum film 7 in the infrared detecting pixel 4b. This makes it difficult for heat to be transferred from the thermocouples in the infrared detecting pixel 4a to the frame 3. The width of the aluminum film 7 is determined so that the difference in the heat loss due to the different position of the infrared detecting pixel is compensated for by the difference in the heat loss through the thermocouples. The width of the aluminum film 7 is determined based on a previously obtained correlation between the position of the infrared detecting pixel and the quantity of heat transferred to the frame 3. This configuration allows the thermocouples to function as thermocouples and as compensation means.

The infrared detector array according to the second embodiment is different from that according to the first embodiment in that the numbers of thermocouples are the same between the infrared detecting pixels 4a and 4b, and that the width of the aluminum film 7 is narrower in the infrared detecting pixel 4a than in the infrared detecting pixel 4b. However, the lamination structure and layout of the thermocouples, the passivation film 8 and the infrared absorbing film 9 are the same as those in the first embodiment. Accordingly, a sufficiently high detection sensitivity can be obtained in each infrared detecting pixel. In addition, in the second embodiment, since the width of the aluminum film 7 in the infrared detecting pixel 4a is narrower than that of the aluminum film 7 in the infrared detecting pixel 4b, the heat loss from the thermocouples is smaller in the infrared detecting pixel 4a than in the infrared detecting pixel 4b. Accordingly, the difference in the heat loss due to the different position of the infrared detecting pixel is compensated for by the difference in the heat loss through the thermocouples. Accordingly, the detection sensitivity of the infrared detecting pixels is made sufficiently uniform.

The second embodiment is not limited to the above. In the second embodiment, an example has been given in which the width of the aluminum film 7 in the infrared detecting pixel 4a is narrower than the width of the aluminum film 7 in the infrared detecting pixel 4b. However, the width of the polysilicon film 5, or the width of both of the polysilicon film 5 and the aluminum film 7, may be narrower in the infrared detecting pixel 4a than in the infrared detecting pixel 4b. This configuration allows the heat loss from the thermocouples to be smaller in the infrared detecting pixel 4a than in the infrared detecting pixel 4b, and thus the difference in the heat loss due to the different position of the infrared detecting pixel is compensated for by the difference in the heat loss through the thermocouples. Accordingly, the detection sensitivity of the infrared detecting pixels is made sufficiently uniform.

Since polysilicon has a greater electric resistance than aluminum, the electric resistance of the thermocouple depends on the polysilicon film. Accordingly, if the width of the polysilicon film is undesirably narrow, the electric resistance of the thermocouple is increased, and thus the noise of the thermocouple is increased, resulting in a poor S/N ratio. Accordingly, when the aluminum film and the polysilicon film are combined, it is preferred to control the heat loss through the thermocouple by adjusting the width of the aluminum film. Also, as will be described later, the heat loss through the thermocouple can be controlled by adjusting the length or thickness of the electrodes constituting the thermocouple. However, also in this case, it is preferred to adjust the length and width of the aluminum film.

Figure 4A:
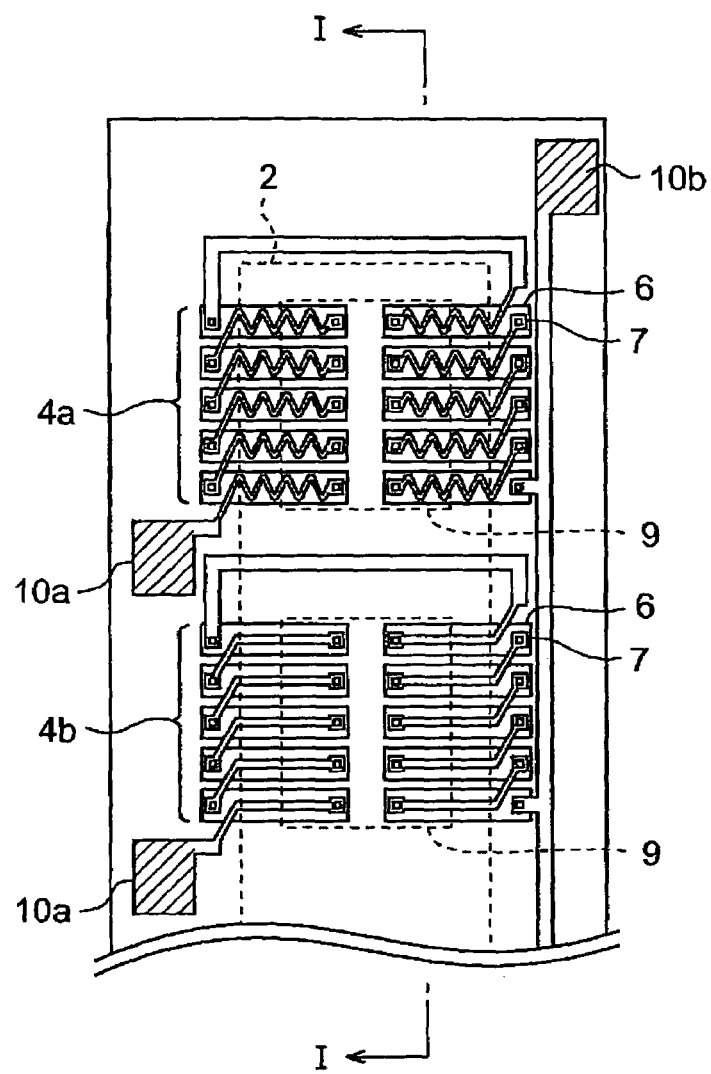
FIG. 4A is a view showing a thermophila pattern of an infrared detector array according to a third embodiment.
Figure 4B:
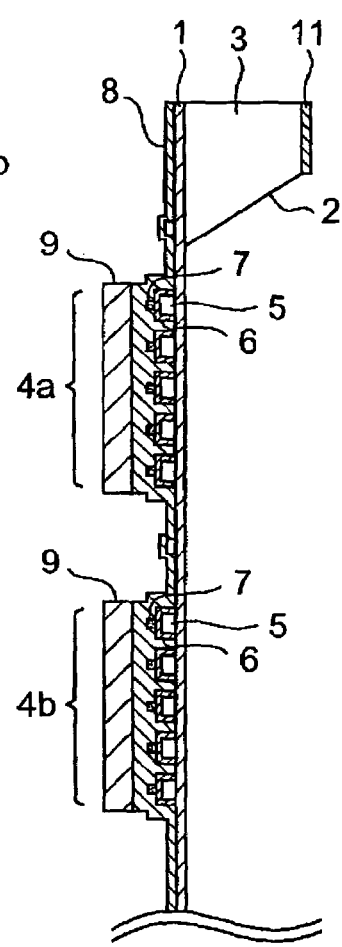
FIG. 4B is a sectional view taken along the line I—I in FIG. 4A.

FIG. 4A is a view showing a thermophila pattern of an infrared detector array according to a third embodiment. FIG. 4B shows a sectional view taken along the line I—I in FIG. 4A. In the second embodiment, the width of the aluminum film 7 in the infrared detecting pixel 4a is narrower than the width of the aluminum film 7 in the infrared detecting pixel 4b. On the other hand, in the third embodiment, the aluminum film 7 in the infrared detecting pixel 4a is corrugated, and thereby the length of the aluminum film 7 in the infrared detecting pixel 4a is longer than the length of the aluminum film 7 in the infrared detecting pixel 4b. The length of the aluminum film 7 is determined so that the difference in the heat loss due to the different position of the infrared detecting pixel is compensated for by the difference in the heat loss through the thermocouples. The length of the aluminum film 7 is determined based on a previously obtained correlation between the position of the infrared detecting pixel and the quantity of heat transferred to the frame 3. This configuration allows the thermocouples to have a function as thermocouples and a function as compensation means.

The third embodiment is different from the first embodiment in that the number of thermocouples is the same between the infrared detecting pixels 4a and 4b, and that the length of the aluminum film 7 is longer in the infrared detecting pixel 4a than in the infrared detecting pixel 4b. However, the lamination structure and the layout of the thermocouples, the passivation film 8 and the infrared absorbing film 9 are the same as those in the first embodiment. Accordingly, a sufficiently high detection sensitivity can be obtained in each infrared detecting pixel. In the third embodiment, since the length of the aluminum film 7 in the infrared detecting pixel 4a is longer than the length of the aluminum film 7 in the infrared detecting pixel 4b, the heat loss through the thermocouples is smaller in the infrared detecting pixel 4a than in the infrared detecting pixel 4b. Therefore, the difference in the heat loss due to the different position of the infrared detecting pixel is compensated for by the difference in the heat loss through the thermocouples. Accordingly, the detection sensitivity of the infrared detecting pixels is made sufficiently uniform.

The third embodiment is not limited to the above. In the third embodiment, an example has been given in which the aluminum film 7 in the infrared detecting pixel 4a is corrugated. However, the aluminum film 7 may have a straight, S-like or zigzag shape as long as its length meets the above requirements.

FIG. 5A is a view showing a thermophila pattern of an infrared detector array according to a fourth embodiment. FIG. 5B is a sectional view taken along the line I—I in FIG. 5A. In the second embodiment, the width of the aluminum film 7 is narrower in the infrared detecting pixel 4a than in the infrared detecting pixel 4b. On the other hand, in the fourth embodiment, the thickness of the aluminum film 7 is smaller in the infrared detecting pixel 4a than in the infrared detecting pixel 4b. The thickness of the aluminum film 7 is determined so that the difference in the heat loss due to the different position of the infrared detecting pixels 4a and 4b is compensated for by the difference in the heat loss through the thermocouples. The thickness of the aluminum film 7 is determined based on a previously obtained correlation between the position of the infrared detecting pixel and the quantity of heat transferred to the frame 3. This configuration allows the thermocouples to work as thermocouples and as compensation means.

The fourth embodiment is different from the first embodiment in that the number of thermocouples is the same between the infrared detecting pixels 4a and 4b, and that the thickness of the aluminum film 7 is smaller in the infrared detecting pixel 4a than in the infrared detecting pixel 4b. However, the lamination structure and layout of the thermocouples, the passivation film 8 and the infrared absorbing film 9 in the fourth embodiment are the same as those in the first embodiment. Accordingly, a sufficiently high detection sensitivity can be obtained in each infrared detecting pixel. In addition, in the fourth embodiment, since the thickness of the aluminum film 7 in the infrared detecting pixel 4a is smaller than the thickness of the aluminum film 7 in the infrared detecting pixel 4b, the heat loss through the thermocouples is smaller in the infrared detecting pixel 4a than in the infrared detecting pixel 4b. owing to this, the difference in the heat loss due to the different position of the infrared detecting pixel is compensated for by the difference in the heat loss through the thermocouples. Accordingly, the detection sensitivity of the infrared detecting pixels is made sufficiently uniform.

Figure 6A:
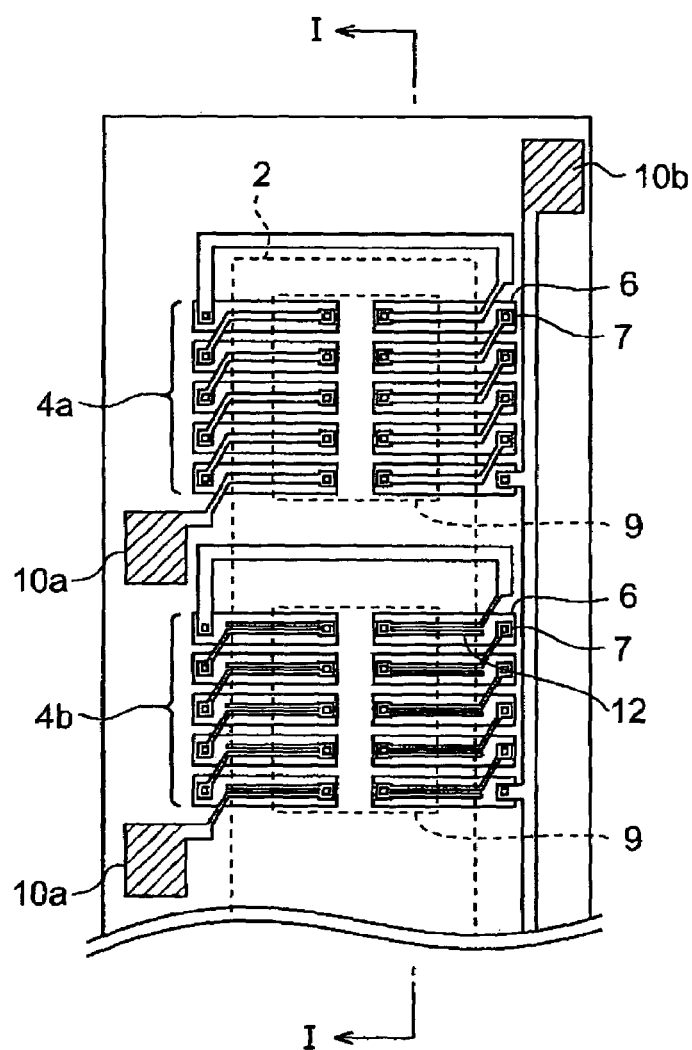
FIG. 6A is a view showing a thermophila pattern of an infrared detector array according to a fifth embodiment.
Figure 6B:
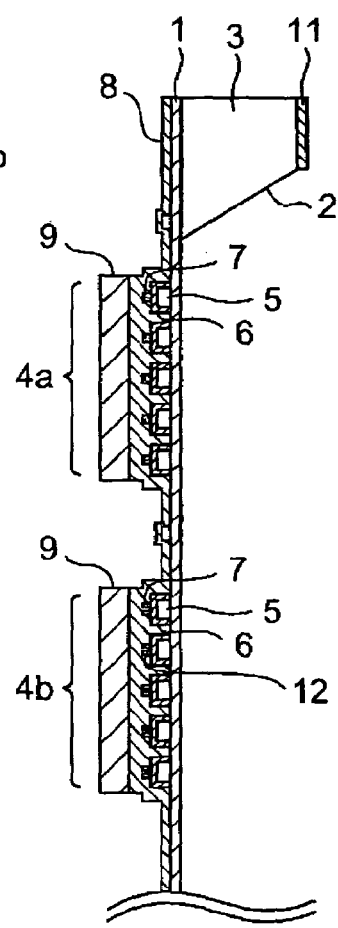
FIG. 6B is a sectional view taken along the line I-in FIG. 6A.

FIG. 6A is a view showing a thermophila pattern of an infrared detector array according to a fifth embodiment. FIG. 6B is a sectional view taken along the line I—I in FIG. 6A. In the infrared detector array according to the sixth embodiment, to the aluminum film 7 in the infrared detecting pixel 4b, a dummy wiring 12 formed of material, which has a thermal conductivity equivalent to or greater than aluminum, is connected. The dummy wiring 12 may be formed of material such as aluminum or gold. The material and the shape of the dummy wirings 12 are selected so that the difference in the heat loss due to the different position of the infrared detecting pixel is compensated for by the difference in the heat loss through the thermocouples. The material and the shape of the dummy wirings 12 are determined based on a previously obtained correlation between the position of the infrared detecting pixel and the quantity of heat transferred to the frame 3. This configuration allows the thermocouples to work as compensation means.

The fifth embodiment is different from the first embodiment in that the number of thermocouples is the same between the infrared detecting pixels 4a and 4b, and that the infrared detecting pixel 4b is further provided with dummy wirings 12. However, the lamination structure and layout of the thermocouples, the passivation film 8 and the infrared absorbing film 9 in the fifth embodiment are the same as those in the first embodiment. Accordingly, a sufficiently high detection sensitivity is achieved in each infrared detecting pixel. In addition, in the fifth embodiment, since the infrared detecting pixel 4b is provided with the dummy wirings 12, part of the heat generated due to absorption of infrared radiation is lost through the dummy wirings 12.

Owing to this, the difference in the heat loss due to the different position of the infrared detecting pixel is compensated for by the heat loss in the dummy wirings. Accordingly, the detection sensitivity of the infrared detecting pixels is made sufficiently uniform.

The fifth embodiment is not limited to the above. In the above description, reference has been made to an example in which the dummy wiring 12 is connected to the aluminum film 7 in the infrared detecting pixel 4b. However, in the infrared detector array according to the fifth embodiment, the dummy wiring may be provided to the silicon film 5, or to both of the silicon film 5 and the aluminum film 7, in the infrared detecting pixel 4b.

Figure 7A:
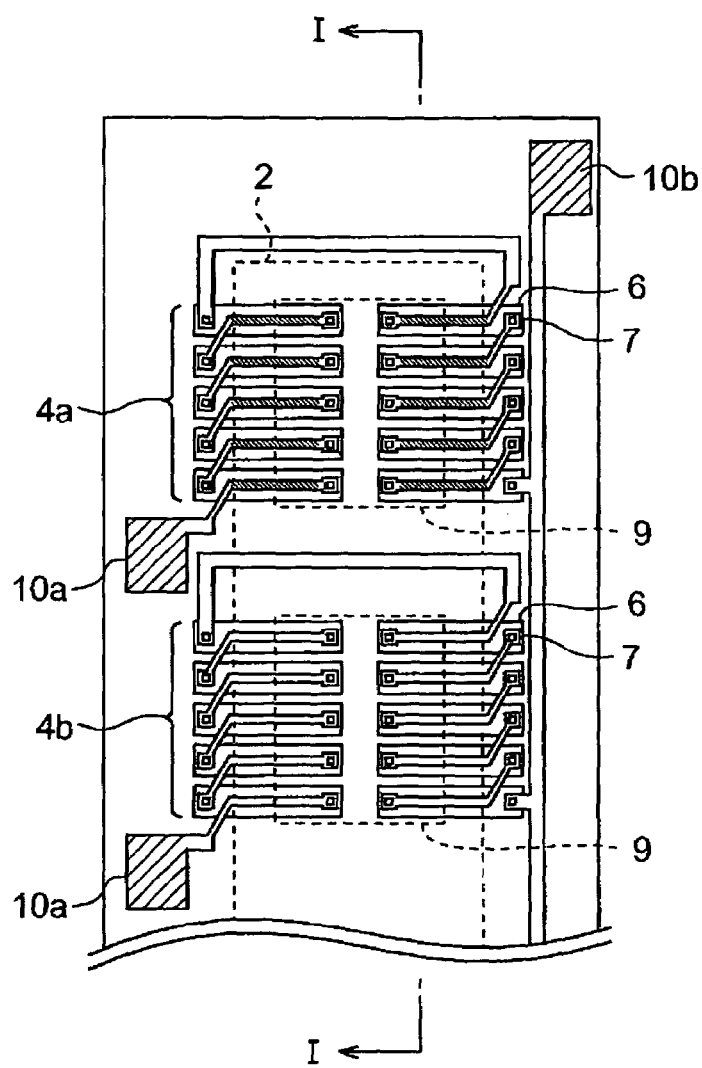
FIG. 7A is a view showing a thermophila pattern of an infrared detector array according to a sixth embodiment.
Figure 7B:
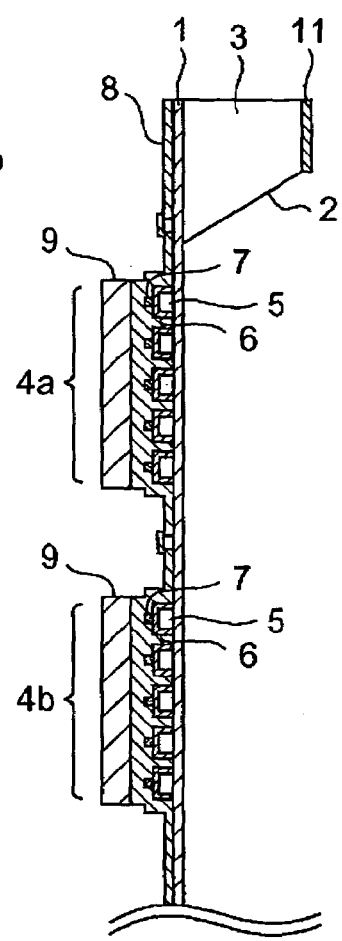
FIG. 7B is a sectional view taken along the line I—I in FIG. 7A.

FIG. 7A is a view showing a thermophila pattern of an infrared detector array according to a sixth embodiment. FIG. 7B is a sectional view taken along the line I—I in FIG. 7A. In the infrared detector array of the sixth embodiment, part of the aluminum film 7 in the infrared detecting pixel 4a is replaced with material having a lower thermal conductivity than that of the aluminum film 7 and capable of being electrically connected with the aluminum film 7. The replaced parts of the aluminum film 7 are indicated by the hatched lines in FIG. 7A. For such material, polysilicon, chromium, titanium and the like are available. What material to use, or how much length of the aluminum film 7 to replace is determined so that the difference in the heat loss due to the different position is compensated for by the difference in the heat loss through the thermocouples. The material and the length to be replaced are determined based on a previously obtained correlation between the position of the infrared detecting pixel and the quantity of heat transferred to the frame 3. This configuration allows the thermocouples to work as compensation means.

The sixth embodiment is different from the first embodiment in that the number of thermocouples is the same between the infrared detecting pixels 4a and 4b, and that part of the aluminum film 7 in the infrared detecting pixel 4a is replaced with the above-described material. However, the lamination structure and layout of the thermocouples, the passivation film 8 and the infrared absorbing film 9 in the sixth embodiment are the same as those in the first embodiment. Accordingly, a sufficiently high detection sensitivity is achieved in each infrared detecting pixel. In addition, in the sixth embodiment, since part of the aluminum film 7 in the infrared detecting pixel 4a is replaced with material having a lower thermal conductivity than that of the aluminum film 7 and capable of being connected with the aluminum film 7, the heat loss through the thermocouples is smaller in the infrared detecting pixel 4a than in the infrared detecting pixel 4b. Owing to this, the difference in the heat loss due to the different position of the infrared detecting pixel is compensated for by the difference in the heat loss through the thermocouples. Accordingly, the detection sensitivity of the infrared detecting pixels is made sufficiently uniform.

The sixth embodiment is not limited to the above. In the sixth embodiment, an example has been given in which part of the aluminum film 7 in the infrared detecting pixel 4a is replaced with material having a lower thermal conductivity than that of the aluminum film 7 and capable of being connected to the aluminum film 7. However, part of the silicon film 5, or part of both of the silicon film 5 and the aluminum film 7 in the infrared detecting pixel 4a may be replaced with material having a lower thermal conductivity than that of the respective materials and capable of being electrically connected thereto.

Figure 8A:
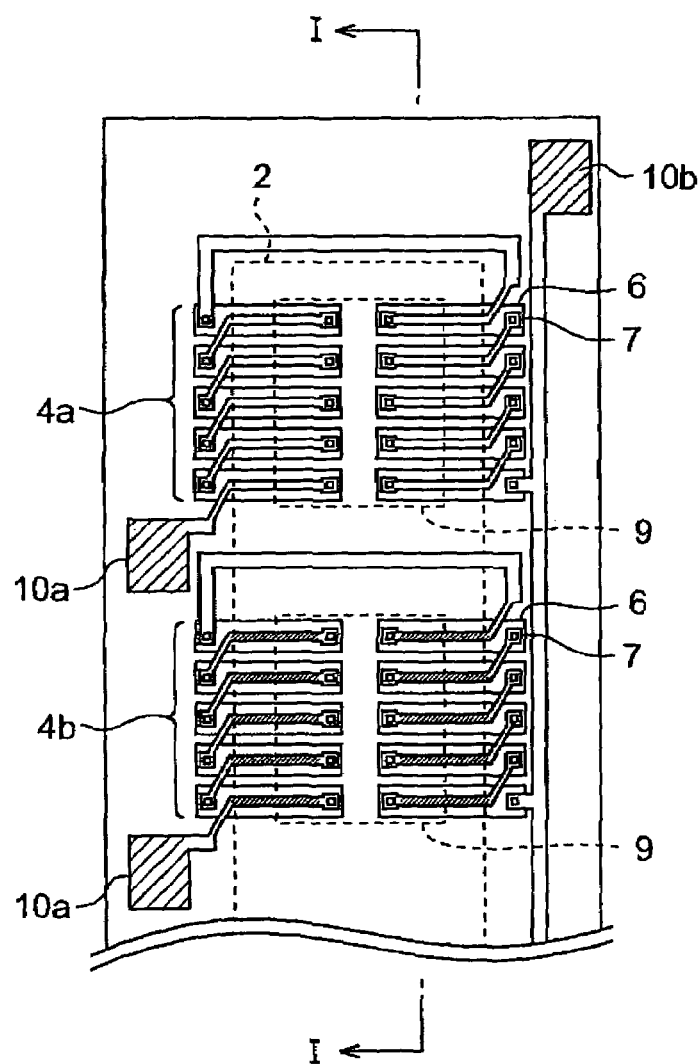
FIG. 8A is a view showing a thermophila pattern of an infrared detector array according to a seventh embodiment.
Figure 8B:
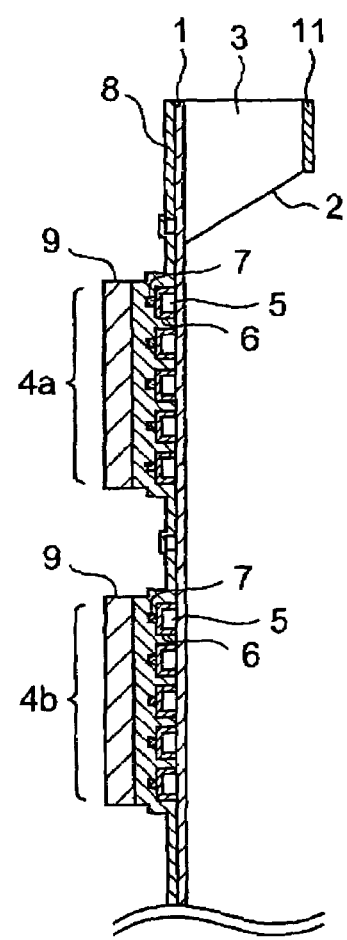
FIG. 8B is a sectional view taken along the line I—I in FIG. 8A.

FIG. 8A is a view showing a thermophila pattern of an infrared detector array according to a seventh embodiment. FIG. 8B is a sectional view taken along the line I—I in FIG. 8A. In the infrared detector array of the sixth embodiment, part of the aluminum film 7 in the infrared detecting pixel 4b is replaced with material having a higher thermal conductivity than that of the aluminum film 7 and capable of being connected to the aluminum film 7. The replaced parts of the aluminum film 7 are indicated by the hatched lines in FIG. 8A. The replaced part may be a lamination of two kinds of metals such as chromium-gold or titanium-gold. What material to use, and how much length of the aluminum film 7 to replace are determined so that the difference in the heat loss due to the different position of the infrared detecting pixel is compensated for by the difference in the heat loss through the thermocouples. The material and the length to be replaced are determined based on a previously obtained correlation between the position of the infrared detecting pixel and the quantity of heat transferred to the frame 3. This configuration allows the thermocouples to work as as compensation means.

The seventh embodiment is different from the first embodiment in that the number of thermocouples is the same between the infrared detecting pixels 4a and 4b, and that part of the aluminum film 7 in the infrared detecting pixel 4b is replaced with the above-described material. However, the lamination structure and layout of the thermocouples, the passivation film 8 and the infrared absorbing film 9 in the seventh embodiment are the same as those in the first embodiment. Accordingly, a sufficiently high detection sensitivity is achieved in each infrared detecting pixel. In addition, in the seventh embodiment, since part of the aluminum film 7 in the infrared detecting pixel 4b is replaced with the material having a higher thermal conductivity than that of the aluminum film 7 and capable of being electrically connected to the aluminum film 7, the heat loss through the thermocouples is smaller in the infrared detecting pixel 4a than in the infrared detecting pixel 4b. owing to this, the difference in the heat loss due to the different position of the infrared detecting pixel is compensated for by the difference in the heat loss through the thermocouples. Accordingly, the detection sensitivity of the infrared detecting pixels is made sufficiently uniform.

The seventh embodiment is not limited to the above. In the sixth embodiment, an example has been given in which part of the aluminum film 7 in the infrared detecting pixel 4b is replaced with material having a thermal conductivity higher than that of the aluminum film 7 and capable of being connected to the aluminum film 7. However, the silicon film 5, or both of the silicon film 5 and the aluminum film 7 in the infrared detecting pixel 4b may be replaced with material having a higher thermal conductivity than that of the respective materials and capable of being electrically connected thereto.

FIG. 9A is a view showing a thermophila pattern of an infrared detector array according to an eighth embodiment. FIG. 9B is a sectional view taken along the line I—I in FIG. 9A. In the first to seventh embodiments described above, all thermocouples are formed of the polysilicon films 5 and the aluminum films 7. On the other hand, in the eighth embodiment, the thermocouples in the infrared detecting pixel 4a are formed of n-type polysilicon films 50 and p-type polysilicon films 51, while the thermocouples in the infrared detecting pixel 4b are formed of n-type or p-type polysilicon films 5 and aluminum films 7. Owing to this, the thermocouples work and as compensation means.

The eighth embodiment is different from the first embodiment in that the number of thermocouples is the same between the infrared detecting pixels 4a and 4b, and that the thermocouples in the infrared detecting pixel 4a are formed of the n-type polysilicon films 50 and the p-type polysilicon films 51. However, the lamination structure and layout of the thermocouples, the passivation film 8 and the infrared absorbing film 9 in the eighth embodiment are the same as those in the first embodiment. Accordingly, a sufficiently high detection sensitivity is achieved in each infrared detecting pixel. In addition, in the eighth embodiment, since the thermocouples in the infrared detecting pixel 4a are formed of the n-type polysilicon films 50 and p-type polysilicon films 51, these thermocouples exhibit higher thermoelectric conversion efficiency than that of the thermocouples in the infrared detecting pixel 4b formed of the polysilicon films 5 and the aluminum films 17. Owing to this, in the infrared detecting pixel 4a, the same electromotive force can be generated with a smaller temperature difference than that of the infrared detecting pixel 4b. Accordingly, the difference in the heat loss due to the different position of the infrared detecting pixel is compensated for by the difference of the thermoelectric conversion efficiency. Accordingly, the detection sensitivity of the infrared detecting pixels is made sufficiently uniform.

The eighth embodiment is not limited to the above. In the eighth embodiment, the thermocouples in the infrared detecting pixel 4a are formed of the n-type polysilicon films and p-type polysilicon films. However, the combination is not limited to this as long as material having a higher thermoelectric conversion efficiency than that of the thermocouples in the infrared detecting pixel 4b is used.

Figure 10A:
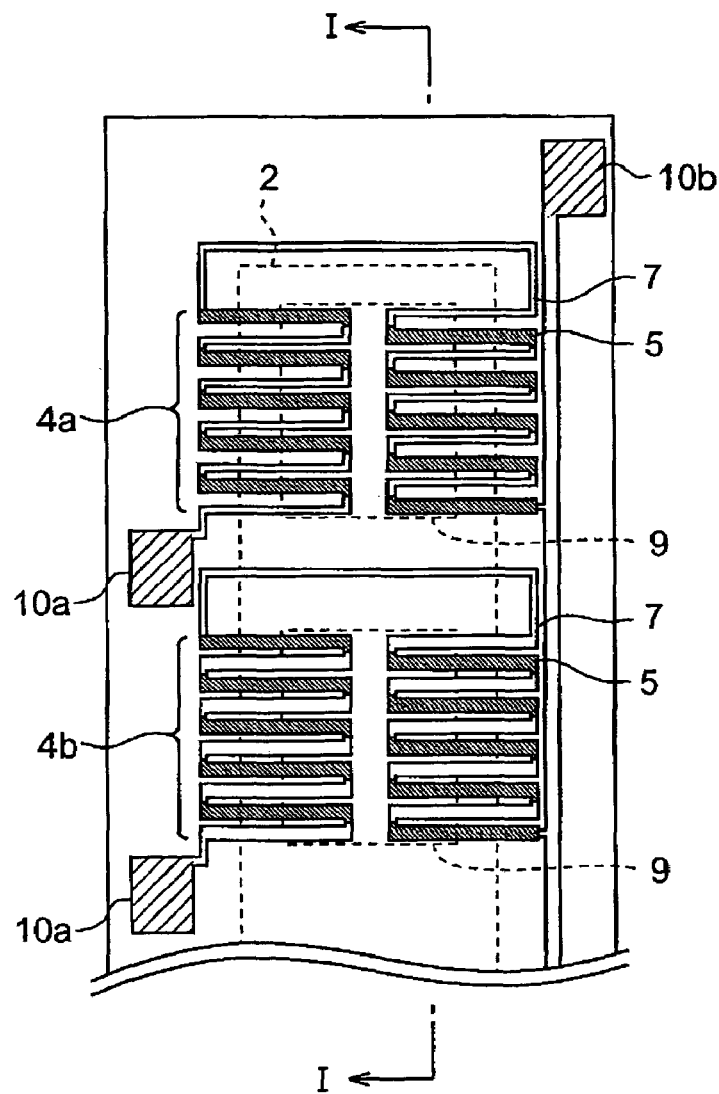
FIG. 10A is a view showing a thermophila pattern of an infrared detector array according to a ninth embodiment.
Figure 10B:
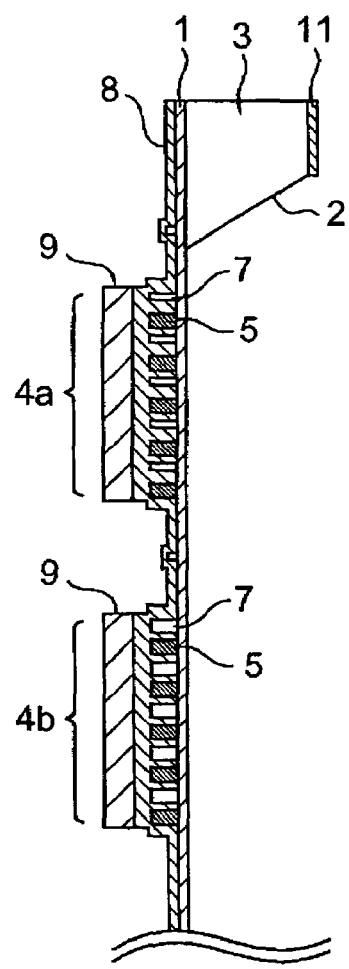
FIG. 10B is a sectional view taken along the line I—I in FIG. 10A.

FIG. 10A is a view showing a thermophila pattern of an infrared detector array according to a ninth embodiment. FIG. 10B is a sectional view taken along the line I—I in FIG. 10A. In the first to eighth embodiments described above, two electrodes (for example, the polysilicon film 5 and the aluminum film 7) are laminated to form a thermocouple. On the other hand, in the thermocouples in the ninth embodiment, the polysilicon film 5 and the aluminum film 7 are juxtaposed to form a thermocouple, and a plurality of the thermocouples are connected in series to form a thermophila. Further, the width of the aluminum film 7 in the infrared detecting pixel 4a is made narrower than the width of the aluminum film 7 in the infrared detecting pixel 4b. The width of the aluminum film 7 is determined so that the difference in the heat loss due to the different position of the infrared detecting pixel is compensated for by the difference in the heat loss through the thermocouples. The width of the aluminum film 7 is determined based on a previously obtained correlation between the position of the infrared detecting pixel and the heat loss to the frame 3. This configuration allows the thermocouples to work as compensation means.

The ninth embodiment is different from the first embodiment in that the polysilicon film 5 and the aluminum film 7 are juxtaposed to form a thermocouple, and that the number of thermocouples is the same between the infrared detecting pixels 4a and 4b. The hot junction of each thermocouple is arranged above the concave portion 2, the cold junction thereof is arranged above the frame 3, and the infrared absorbing layer is formed so as to cover the hot junctions. Accordingly, in each infrared detecting pixel, a high detection sensitivity can be obtained as with the infrared detecting pixel in the first embodiment. In addition, as with the second embodiment, the width of the aluminum film 7 is made narrower in the infrared detecting pixel 4a than in the infrared detecting pixel 4b. Accordingly, the heat loss the thermocouples is smaller in the infrared detecting pixel 4a than in the infrared detecting pixel 4b. Owing to this, the difference in the heat loss due to the different position of the infrared detecting pixel is compensated for by the difference in the heat loss dissipated through the thermocouples. Accordingly, the detection sensitivity of the infrared detecting pixels is made sufficiently uniform.

The ninth embodiment is not limited to the above. In the ninth embodiment, an example has been given in which the width of the aluminum film 7 in the infrared detecting pixel 4a is made narrower than the width of the aluminum film 7 in the infrared detecting pixel 4b. However, the length of the aluminum film 7 in the infrared detecting pixel 4a may be made shorter, or the thickness thereof may be made smaller.

INDUSTRIAL APPLICABILITY

In the infrared detector array according to the present invention, three or more infrared detecting pixels are formed on the thin film in an array so that the hot junction of each thermocouple is arranged above the concave portion and the cold junction thereof is arranged above the frame.

Accordingly, in each infrared detecting pixel, the heat generated due to infrared absorption can be transferred from the infrared absorbing layer to the thermocouples efficiently. Although the heat loss to the frame in the first infrared detecting pixel is greater than the heat loss to the frame in the second infrared detecting pixel arranged in the intermediate portion, the difference in the electromotive force due to heat loss is compensated for by the compensation means. Therefore, the detection sensitivity of the infrared detecting pixels can be made substantially uniform irrespective of the position thereof without enlarging the concave portion of the frame, or forming a concave portion for each infrared detecting pixel.

Accordingly, a plurality of infrared detecting pixels can be integrated, and the detection sensitivity thereof can be made sufficiently high and uniform.

The invention claimed is:

1. An infrared detector array comprising:
   a thin film formed from insulating material;
   a frame having a concave portion and supporting a periphery portion of said thin film;
   three or more infrared detecting pixels arranged on said thin film in an array pattern, each pixel being configured such that a plurality of thermocouples having hot junctions formed above said concave portion and cold junctions formed above said frame are connected in series and an infrared absorbing layer is formed so as to cover said hot junctions from above; and
   compensation means for compensating for a difference between detection sensitivity of the first infrared detecting pixel arranged in a peripheral end portion and detection sensitivity of the second infrared detecting pixel arranged in an intermediate portion based on a correlation between thermoelectromotive force, which is extracted when said infrared detecting pixel is illuminated with infrared radiation, and its position.

2. The infrared detector array according to claim 1, wherein
   said thin film is comprised of a film of insulating material formed on a silicon substrate, and
   said frame has been formed by etching an area of said silicon substrate enclosed by its periphery portion from a face opposite to a face on which said thin film is formed.

3. The infrared detector array according to claim 1, wherein one of members constituting said thermocouple is made of polysilicon having a predetermined conductivity type and the other is aluminum.

4. The infrared detector array according to claim 1, wherein said compensation means is realized by providing a greater number of said thermocouples in said first infrared detecting pixel than in said second infrared detecting pixel.

5. The infrared detector array according to claim 1, wherein said compensation means is realized by setting a width of a member constituting said thermocouple to be narrower in said first infrared detecting pixel than in said second infrared detecting pixel.

6. The infrared detector array according to claim 1, wherein said compensation means is realized by setting a length of a member constituting said thermocouple to be longer in said first infrared detecting pixel than the length in said second infrared detecting pixel.

7. The infrared detector array according to claim 1, wherein said compensation means is realized by setting a thickness of a member constituting said thermocouple to be smaller in said first infrared detecting pixel than the thickness in said second infrared detecting pixel.

8. The infrared detector array according to claim 1, wherein said compensation means is realized by said second infrared detecting pixel further comprising a dummy wiring which is connected to a member constituting said thermocouple and which is formed from material having a thermal conductivity greater than or equal to that of an electrode of said thermocouple.

9. The infrared detector array according to claim 1, wherein said compensation means is realized by replacing part of a member constituting said thermocouple in said first infrared detecting pixel with material having a lower thermal conductivity than that of said member and capable of being electrically connected to said member.

10. The infrared detector array according to claim 1, wherein said compensation means is realized by replacing part of a member constituting said thermocouple in said second infrared detecting pixel with material having a higher thermal conductivity than that of said member and capable of being electrically connected to said member.

* * * * *